United States Patent [19]

Kadosawa

[11] Patent Number: 4,566,036
[45] Date of Patent: Jan. 21, 1986

[54] REMOTE CONTROL APPARATUS

[75] Inventor: Tsuneaki Kadosawa, Ninomiya, Japan

[73] Assignee: Canon Kabushiki Kaisha, Tokyo, Japan

[21] Appl. No.: 615,547

[22] Filed: May 31, 1984

[30] Foreign Application Priority Data

Jun. 7, 1983 [JP] Japan ................................. 58-100239
Jun. 17, 1983 [JP] Japan ................................. 58-107851

[51] Int. Cl.$^3$ .............................................. H04N 5/26
[52] U.S. Cl. .................................... 358/210; 358/209; 358/227; 358/228
[58] Field of Search .............. 358/210, 209, 228, 227, 358/229, 225; 340/286 M, 700, 709, 706, 712; 178/18; 352/140

[56] References Cited

U.S. PATENT DOCUMENTS

| | | | |
|---|---|---|---|
| 3,552,037 | 1/1971 | Stern | 340/700 |
| 3,567,950 | 3/1971 | Meyer | 250/219 |
| 3,984,628 | 10/1976 | Sharp | 358/210 |
| 4,280,135 | 7/1981 | Schlossberg | 358/93 |
| 4,286,289 | 8/1981 | Ottesen | 358/125 |
| 4,290,679 | 9/1981 | Vockennuber | 354/196 |
| 4,430,526 | 2/1984 | Brown et al. | 178/18 |

FOREIGN PATENT DOCUMENTS 0077281  6/1980  Japan ................................. 358/210

Primary Examiner—Thomas W. Brown
Assistant Examiner—Robert G. Lev
Attorney, Agent, or Firm—Fitzpatrick, Cella, Harper & Scinto

[57] ABSTRACT

Disclosed is a remote control apparatus provided with a plurality of universal heads supporting cameras thereon and effecting panning and tilting of the cameras, a console for producing an electrical signal regarding an object to which the cameras are to be turned, an electrical memory device for storing information for determining the angle of panning and the angle of tilting, and a control device for controlling the universal heads by the stored information and the electrical signal. The apparatus turns the cameras to the moving object according to the signals from the console and the respective memory devices of each camera.

17 Claims, 4 Drawing Figures

REMOTE CONTROL APPARATUS

BACKGROUND OF THE INVENTION

1. Field of the Invention

This invention relates to an apparatus for remotely carrying out the operation of turning television cameras or measuring devices to an object.

2. Description of the Prior Art

Generally, in a circular or elliptical athletic field or race track, a plurality of universal head systems having image pickup machines mounted on universal heads are disposed at different positions and photographing is effected while pursuing an object moving on the field or track. In this case, operators are stationed for the respective universal head systems and it is usually the practice for each operator to effect horizontal pivotal movement (hereinafter referred to as pan) of the supporting stage of the universal head system, vertical pivotal movement (hereinafter referred to as tilt) of said supporting stage and control of the zooming or focusing of the image pickup machine. An apparatus has also been proposed in which one of a plurality of universal head systems is designated as the main universal head system and an operator is stationed for this main universal head system and any variation in the movement of the controlled main universal head system is transmitted to the auxiliary universal head systems by a cam to thereby effect control. In the former case, each universal head system requires an operator, and in the latter case, when the universal head systems have been moved to other places, it is necessary to replace the cam with a cam matching the arrangement of the universal head systems and therefore, where the universal head systems are used at several locations, a number of cams must be prepared, and this leads to an increased cost and cumbersome procedure of interchanging the cam. Particularly, even when the positions of the universal head systems have been slightly shifted, the cam in use must be replaced with another cam and therefore, in reality, it is usual to use universal heads fixed in place, and this leads to a disadvantage that the images photographed lack freshness.

SUMMARY OF THE INVENTION

It is an object of the present invention to operate an apparatus such as a camera from a remote place.

It is another object of the present invention to turn a plurality of apparatuses to an object at a time.

It is still another object of the present invention to enable an operator to execute panning and tilting of a plurality of apparatuses.

It is yet still another object of the present invention to readily cope with a case where the arrangement of a plurality of apparatuses has been changed or a case where the apparatuses have been moved to other locations.

It is a further object of the present invention to automatically realize focusing of the apparatus.

It is still a further object of the present invention to automatically realize zooming of the apparatus.

The invention will become fully apparent from the following detailed description thereof taken in conjunction with the accompanying drawings.

DESCRIPTION OF THE PREFERRED EMBODIMENTS

Figure 1:
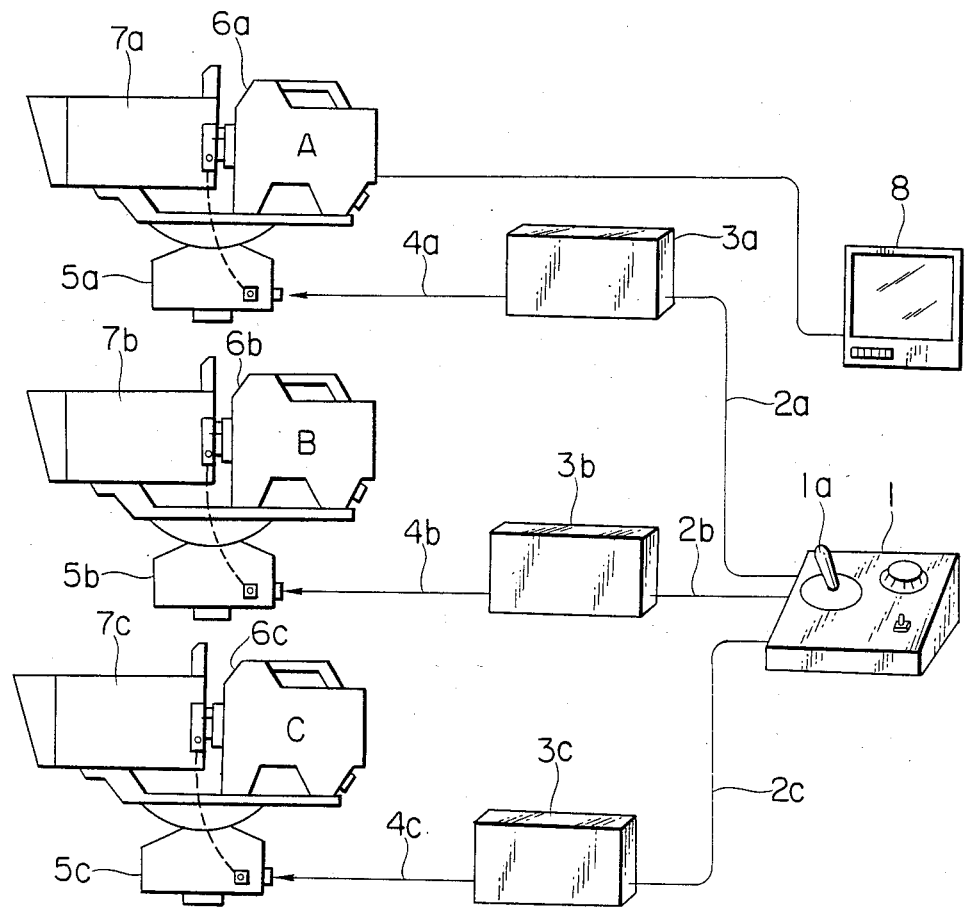
FIG. 1 shows the entire construction of a first embodiment of the present invention.
Figure 2:
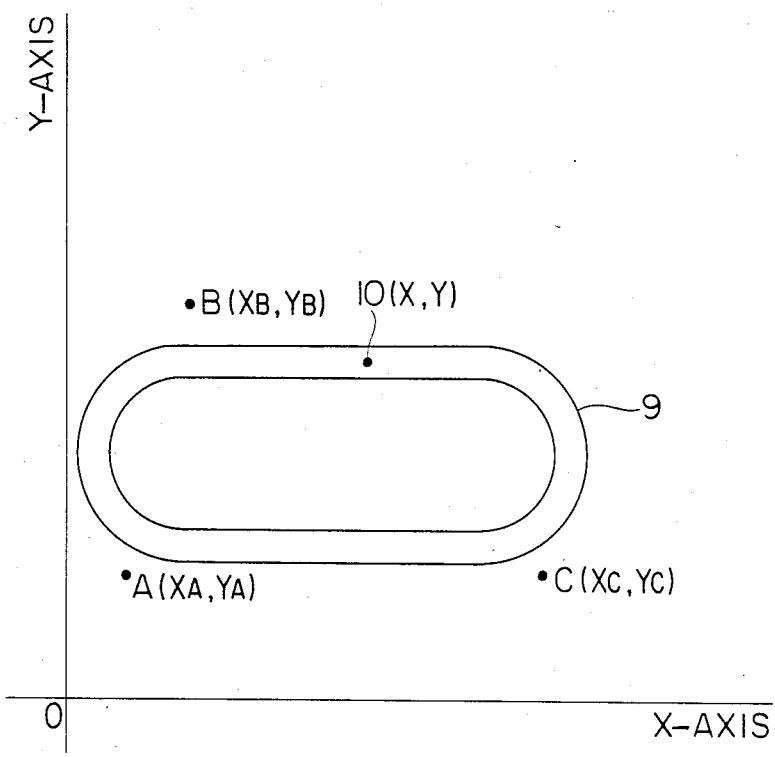
FIG. 2 shows the arrangement of universal head systems with respect to a track.

An embodiment of the present invention will hereinafter be described by reference to the drawings. FIG. 1 shows a construction for remotely controlling universal head systems A, B and C comprising a universal head 5a and a television image pickup machine 6a placed on the stage of the universal head, a universal head 5b and a television image pickup machine 6b, and a universal head 5c and a television image pickup machine 6c, respectively. The universal heads 5a, 5b and 5c realize the panning and tilting of the stages in response to an input signal. Rotary encodes for detecting the direction of panning and the direction of tilting are incorporated in the universal heads 5a, 5b and 5c, and put out the current angle of pan and the current angle of tilt. TV cameras 6a, 6b and 6c are respectively provided with lenses 7a, 7b and 7c capable of focusing and zooming. FIG. 2 is an arrangement view showing the universal head systems A, B and C disposed near a flat athletic track 9. It is to be understood that each of the universal head systems is installed on a tower.

In FIG. 1, a pursuit controller 1 puts out the position information of a moving object 10 (FIG. 2) by the operator observing the position (to be described) of the moving object 10 through a monitor television set 8 and operating a joy stick 1a so that the object lies at the center of the viewing screen of the television receiver 8. The position information of the object 10 put out by this pursuit controller 1 is input to a control operation device 3a for the universal head system A, a control operation device 3b for the universal head system B and a control operation device 3c for the universal head system C through communication lines 2a, 2b and 2c, respectively. When the control operation devices 3a, 3b and 3c operate universal head system control signals to be described and put out the result of the operation to the universal heads 5a, 5b and 5c through control cables 4a, 4b and 4c, the universal heads cause the cameras 6a, 6b and 6c to face the object 10. Any additional universal system may be added by a construction similar to what has been described above.

Operation of the above-described embodiment will now be described by reference to FIG. 2. First, an X–Y coordinates system including the universal head systems A, B and C and the athletic track 9 is set. Accordingly, the position information of the universal head systems A, B and C in the X–Y coordinates can be represented by $A(X_A, Y_A)$, $B(X_B, Y_B)$ and $C(X_C, Y_C)$, and the values of these are constant. If the heights of the disposed universal head systems A, B and C are $H_A$, $H_B$ and $H_C$, respectively, and further, the height of the object 10 moving on the athletic track 9 is neglected, the position information of the object 10 can be represented by X, Y.

The control operation devices 3a, 3b and 3c which have programmed the X–Y coordinates system and an operational equation to be described are caused to store said position by the use of the controller 1 when the universal head systems A, B and C are disposed at the positions shown in FIG. 2. Next, when photographing is to be effected with the moving object 10 being pursued by the image pickup machines 6a, 6b and 6c at a time, the operator operates the joy stick 1a while observing the monitor television 7 and inputs an analog signal X, Y to the pursuit controller 1. The position information X, Y of the object processed by the pursuit controller 1 is transmitted to the control operation devices 3a, 3b and 3c through the communication lines 2a, 2b and 2c.

Operation of the universal head system A will now be described. The control operation device 3a calculates, from the position $X_A$, $Y_A$ of the universal head system A in the X-Y coordinates system and the position X, Y of the object 10, the angle of rightward and leftward movement, i.e., the angle of pan $PAN_A$, of the universal head 5a by $$PAN_A = \tan^{-1}\frac{Y - Y_A}{X - X_A} + Q_A$$

where $Q_A$ is the central direction of the angle of pan of the universal head 5a. Also, the operation device 3a calculates the distance $D_A$ between the universal head system A and the object 10 by $$D_A = \sqrt{(X - X_A)^2 + (Y - Y_A)^2 + H_A^2}$$

and then calculates angle of vertical movement, i.e., the angle of tilt $TILT_A$, of the universal head 5a by $$TILT_A = \tan^{-1}\frac{H_A}{D_A}.$$

The thus calculated data is transmitted to the universal head 5a through a control cable 4a, whereby the universal head system A is controlled. As regards the universal head systems B and C and the added universal head system also, the angle of pan, the angle of tilt and the distance to the object can be calculated by similar operations and can be controlled.

Control of the zooming and focusing of the image pickup machines 6a, 6b and 6c will now be described. For example, by the object distance $D_A$ calculated with respect to the universal head system A, the height l of the object 10 and the zoom parameter $Z_A$ of the image pickup machine 6a, the size (height) $L_A$ of the object in the picture plane photographed by the image pickup machine 6a can be represented by $$L_A = \frac{l}{D_A} \cdot Z_A$$

and accordingly, if the image pickup machine 6a calculates $$Z_A = \frac{L_A}{l} \cdot D_A,$$

control of zooming will become possible. Where such photographing that the size $L_A$ of the object in the picture plane is always constant is effected, $L_A/l$ is constant and accordingly, if $D_A$ is calcuated, control of zooming will become possible.

Further, as regards the control of the focusing of the image pickup machine 6a, the amount of forward movement I of the lens of the image pickup machine 6a from when the image pickup machine 6a is in focus to infinity until the image pickup machine 6a is focused to the distance $D_A$ can be represented by $$I = \frac{kf_A^2}{D_A - f_A}$$

and can be easily realized by calculation of $D_A$. In the above equation, $f_A$ is the focal length of the moving lens of the image pickup machine 6a, and k is a constant.

In the above-described embodiment, the joy stick 1a is used to input the position X, Y of the object 10 to the pursuit controller 1, but it may be replaced by either a set of rotary encoders provided with a dial or a mouse, and it is also possible to express the athletic track on the television screen and input the same while pushing a light-receiving element such as a light pen against the position of the object on the television screen.

Further, in the above-described embodiment, to facilitate the description, a case where the athletic track is flat, that is, a case where the object lies on the X-Y coordinates system, has been taken as an example, but where the athletic track is inclined, the position of the object may be set on the X-Y-Z coordinates system. Where the surface of the athletic track has a predetermined curvature, the position information in the Z-direction is a function of X and Y and accordingly, the distance $D_{AA}$ between the universal head system A and the object can be calculated by $$D_{AA} = \sqrt{(X - X_A)^2 + (Y - Y_A)^2 + \{f(x, y) - H_A\}^2}$$

Figure 3:
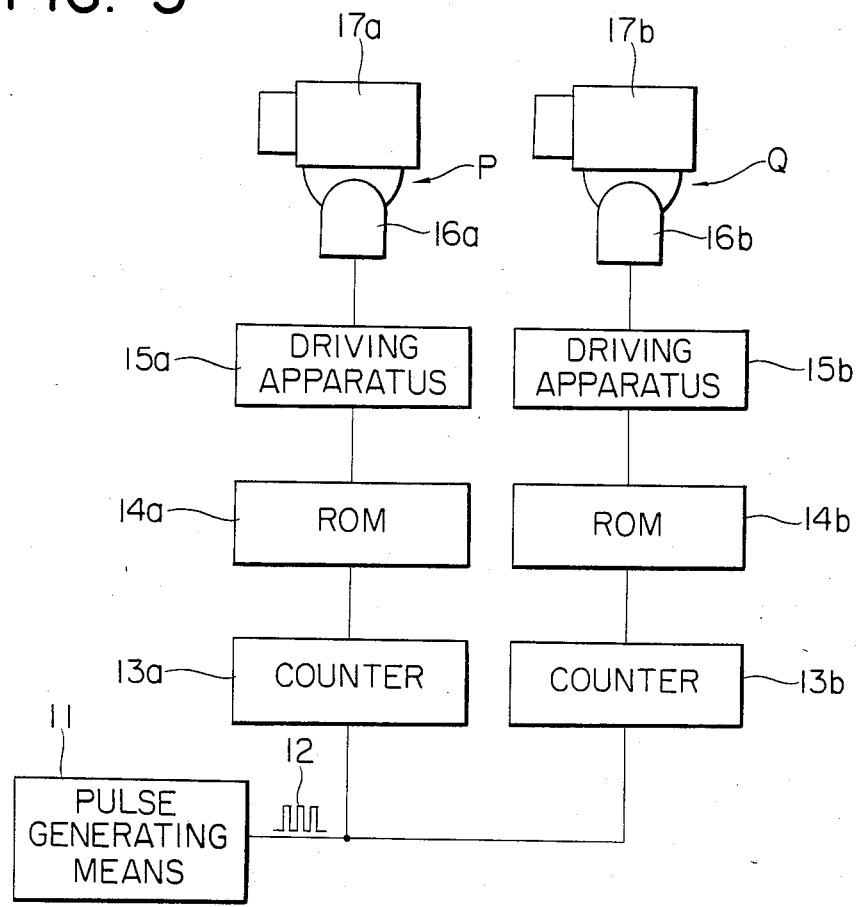
FIG. 3 shows the entire construction of a second embodiment of the present invention.
Figure 4:
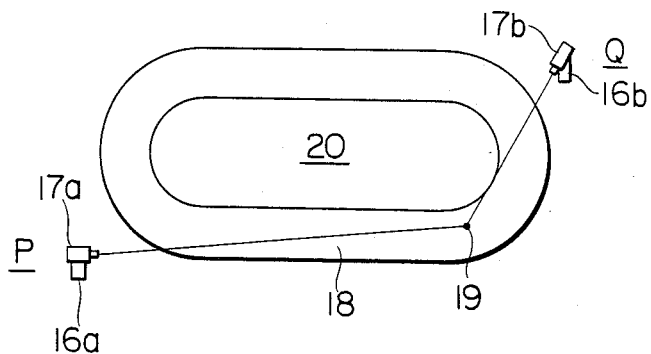
FIG. 4 shows the arrangement of universal head systems with respect to a track.

Another embodiment of the present invention will hereinafter be described. FIG. 3 shows a construction for remotely controlling universal head systems P and Q comprising a universal head 16a and an image pickup machine 17a, and a universal head 16b and an image pickup machine 17b, respectively. FIG. 4 is an arrangement view showing the universal head systems P and Q as disposed near a track 18.

In FIG. 3, reference numeral 11 designates pulse generating means. The operator observes an object 19 moving on the track 18 by a monitor television or the like and operates a rotary encoder, a joy stick or a light pen and causes the pulse generating means to generate a number of pulses corresponding to the amount of movement of the object 19. The pulse signal 12 generated by the pulse generating means 11 is input to the counters 13a and 13b of the universal head systems P and Q, respectively. Reference characters 14a and 14b denote ROMs (read only memories) which store the angles of turn in the horizontal direction (pan) of the universal heads 16a and 16b of the universal head systems P and Q relative to addresses allotted to the positions along the track 8, for example, the positions at 1 m each, the angles of turn in the vertical direction (tilt) and the degrees of zooming and focusing of the image pickup devices 17a and 17b. The aforementioned data are input to ROMs 14a and 14b with the positions of the universal head systems P and Q and the size, shape, height, etc. of the track 18 taken into account when the universal head systems P and Q are arranged as shown in FIG. 4. Reference characters 15a and 15b designate driving devices for the universal head systems P and Q. The driving devices 15a and 15b control the pan and tilt of the universal heads 16a and 16b and the zooming and focusing of the image pickup machines 17a and 17b. Any additional universal head system may of course be added by a construction similar to what has been described above.

Operation of the above-described embodiment will now be described. When the object 19 advances on the track 18 by 1 m, for example, the operator operates the pulse generating means 11 to cause it to generate a signal corresponding to this amount of movement of the object 19, for example, a one-pulse signal. This pulse signal is counted by the counters 13a and 13b and the counted signal is input as the address signal of ROMs 14a and 14b to ROMs 14a and 14b. By this address signal, ROMs 14a and 14b read out the prestored data of the pan and tilt of the universal heads 16a and 16b at the position whereat the object 19 has advanced by 1 m data of zooming and focusing of the image pickup machines 17a and 17b, and put out these data to the driving devices 15a and 15b. Accordingly, the universal head systems P and Q are driven by the driving devices 15a and 15b in accordance with these data and are directed to the position at which the object 19 has advanced by 1 m.

In the above-described embodiment, the counters 13a and 13b are provided for the universal head systems P and Q, respectively, but the control signal (pulse number) may be counted by a single counter and thereafter the counted number may be utilized as the address signal of ROMs 14a and 14b for the universal head systems P and Q, and as memory means, use may also be made of a semiconductor memory such as RAM or other memory than the semiconductor memory (such other memory should desirably be capable of rewriting).

Further, in the above-described embodiment, the pulse generating means is means which generates a pulse signal corresponding to the amount of movement of the object by the operator operating the rotary encoder or the like, but it is also possible to dispose a main universal head system near the center 20 of the track 18 as shown in FIG. 4 and generate a pulse signal by the variation (for example, the variation in the angle of pan) caused when the main universal head system has been operated, thereby controlling the auxiliary universal head systems.

In addition, in the above-described embodiment, the amount of movement of the object is put out in the form of a pulse signal and it is utilized as the address signal of the memory means, but of course, the amount of movement of the object may be put out in the form of an analog signal, for example, a voltage signal and this voltage signal may be A/D-converted and utilized as the address signal of the memory means.

As described above, when photographing is to be effected by the apparatus of the present invention, a single operator may only be stationed and even if the universal head systems are changed in arrangement, the data of each address of the memory means may be changed and thus, an inexpensive remote control image pickup apparatus can be realized.

What I claim is:

1. A remote control apparatus provided with:
   a plurality of cameras;
   a plurality of universal heads for supporting said cameras thereon and effecting panning and tilting of said cameras;
   signal producing means for producing an electrical signal regarding the position of an object to which said cameras are to be turned;
   electrical memory means for storing information for determining the angle of panning and the angle of tilting; and
   control means for controlling the panning and tilting of said universal heads by said stored information and said electrical signal to turn said cameras to said object.

2. A remote control apparatus according to claim 1, wherein said control means replaces the position and height of said universal heads and the position of said object with points on an orthogonal coordinates system and operates the angle of panning and the angle of tilting from said two points.

3. A remote control apparatus according to claim 1, wherein said control means selectively reads out from said electrical memory means the angle of panning and the angle of tilting corresponding to each number set on a predetermined track.

4. A remote control apparatus according to claim 1, wherein said control means effects focus adjustment of said cameras.

5. A remote control apparatus according to claim 1, wherein said control means effects zooming adjustment of said cameras so that the image of said object is photographed always at predetermined dimensions.

6. A remote control apparatus according to claim 1, further provided with a television display device for projecting the image by one of said cameras.

7. A remote control apparatus provided with:
   adjusting means having a supporting bed and effecting the adjustment for turning said supporting bed toward an object;
   signal producing means for producing a position signal regarding the position of said object;
   operation means for replacing the set position of said adjusting means and the position of said object with points on a coordinates system and operating the angle of adjustment for making the direction of said supporting bed coincide with the direction of said object, said operation means effecting said operation in response to said position signal; and
   driving means for driving said adjusting means in conformity with said angle of adjustment.

8. A remote control apparatus according to claim 7, wherein a plurality of said adjusting means are provided and said driving means turns a plurality of supporting beds to said object at a time.

9. A remote control apparatus according to claim 7, wherein said adjusting means is installed at a predetermined height and said angle of adjustment comprises a horizontal angle component and a vertical angle component.

10. A remote control apparatus according to claim 7, further provided with a television camera having distance adjusting means and mounted on said supporting bed and wherein said operation means operates the distance between said object and said television camera and puts out a first control signal for controlling said distance adjusting means.

11. A remote control apparatus according to claim 7, further provided with a television camera having zooming adjusting means and mounted on said supporting bed and wherein said operation means operates a zooming adjusting value for photographing said object at the same dimensions by said television camera and puts out a second control signal for controlling said zooming adjusting means.

12. A remote control apparatus provided with:
adjusing means having a supporting bed and effecting adjustment of said supporting bed so as to pursue an object moving on a predetermined track;
signal producing means for producing an electrical signal regarding the current position of said object;
electrical memory means storing adjusted values regarding the positions of said object when said supporting bed has been turned to a plurality of addresses set on said track; and
control means for reading out the adjusted value stored in said memory means in response to said electrical signal and controlling said adjusting means in accordance with said adjusted value.

13. A remote control apparatus according to claim 12, wherein a plurality of said adjusting means are provided and said control means turns a plurality of supporting beds to said object at a time.

14. A remote control apparatus according to claim 12, wherein said adjusting means is set at a predetermined height and said adjusted value comprises a horizontal angle component and a vertical angle component.

15. A remote control apparatus according to claim 12, further provided with a television camera having distance adjusting means and mounted on said supporting bed and wherein said memory means stores the distance value to each of said addresses, and said control means reads out the distance value stored in said memory means in response to said electrical signal and controls said adjusting means in conformity with said distance value.

16. A remote control apparatus according to claim 12, further provided with a television camera having zooming adjusting means and mounted on said supporting bed and wherein said memory means stores the zooming adjusting value for photographing the object on each of said addresses at the same dimensions by said television camera, and said control means reads out the zooming adjusting value stored in said memory means in response to said electrical signal and controls said adjusting means in conformity with said zooming adjusting value, 17. A remote control apparatus according to claim 12, wherein the content of said memory means can be rewritten.

* * * * *

UNITED STATES PATENT AND TRADEMARK OFFICE
CERTIFICATE OF CORRECTION

PATENT NO. : 4,566,036
DATED : January 21, 1986
INVENTOR(S) : TSUNEAKI KADOSAWA

It is certified that error appears in the above-identified patent and that said Letters Patent is hereby corrected as shown below:

Column 2, line 24, change "encodes" to --encoders--.

Column 3, lines 5-6, change "at a time," to --simultaneously,--; and
      line 65, change "calcuated," to --calculated,--.

Column 4, line 59, change "track 8," to --track 18,--.

Column 7, line 4, change "adjusing means" to --adjusting means--.

Column 8, line 22, change "value," to --value.--.

Signed and Sealed this

Ninth Day of September 1986

[SEAL]

Attest:

Attesting Officer

DONALD J. QUIGG

Commissioner of Patents and Trademarks